(12) United States Patent
Bustamante

(10) Patent No.: US 9,459,427 B2
(45) Date of Patent: Oct. 4, 2016

(54) FIBER OPTIC FAN-OUT/BREAK-OUT KIT CLOSURE/HOUSING

(71) Applicant: Nathan J. Bustamante, Denver, CO (US)

(72) Inventor: Nathan J. Bustamante, Denver, CO (US)

( * ) Notice: Subject to any disclaimer, the term of this patent is extended or adjusted under 35 U.S.C. 154(b) by 0 days.

(21) Appl. No.: 14/994,123

(22) Filed: Jan. 12, 2016

(65) Prior Publication Data

US 2016/0202438 A1    Jul. 14, 2016

Related U.S. Application Data

(60) Provisional application No. 62/102,566, filed on Jan. 12, 2015.

(51) Int. Cl.
*G02B 6/00* (2006.01)
*G02B 6/44* (2006.01)

(52) U.S. Cl.
CPC ........... *G02B 6/4471* (2013.01); *G02B 6/4477* (2013.01)

(58) Field of Classification Search
CPC .................. G02B 6/4471; G02B 6/4477
See application file for complete search history.

(56) References Cited

U.S. PATENT DOCUMENTS

| | | | | |
|---|---|---|---|---|
| 4,824,204 A | * | 4/1989 | Pafford | G02B 6/2804 385/31 |
| 4,883,336 A | * | 11/1989 | Bock | G02B 6/4471 385/138 |
| 7,121,732 B2 | * | 10/2006 | Pimpinella | G02B 6/4471 385/53 |
| 2005/0276551 A1 | * | 12/2005 | Brown | G02B 6/4472 385/100 |
| 2006/0088250 A1 | * | 4/2006 | Pimpinella | G02B 6/4471 385/78 |
| 2008/0138026 A1 | * | 6/2008 | Yow | G02B 6/4477 385/137 |
| 2012/0230636 A1 | * | 9/2012 | Blockley | G02B 6/4471 385/59 |
| 2013/0028568 A1 | * | 1/2013 | Beamon | G02B 6/4444 385/136 |
| 2013/0170801 A1 | * | 7/2013 | Do | G02B 6/4416 385/101 |
| 2013/0183012 A1 | * | 7/2013 | Cabanne Lopez | G02B 6/4471 385/100 |

* cited by examiner

*Primary Examiner* — Rhonda Peace
(74) *Attorney, Agent, or Firm* — Evergreen Valley Law Group; Kanika Radhakrishnan

(57) ABSTRACT

A fiber optic fan-out/break-out kit Closure/Housing for protecting fiber optic strands associated with the fiber optic cable. The fiber optic fan-out/break-out Closure/Housing comprises of a female shell, a male shell, an insert piece and an insert tool. The insert tool is temporarily attached to the insert piece thereby screwing the insert piece into the male shell.

7 Claims, 7 Drawing Sheets

FIBER OPTIC FAN-OUT/BREAK-OUT KIT CLOSURE/HOUSING

TECHNICAL FIELD

Embodiments of the disclosure relate generally to fiber optic cable industry. Embodiments relate more particularly to a fiber optic fan-out/break-out kit Closure/Housing that is assembled in a particular, pre-set manner.

BACKGROUND

An electrical cable is made of two or more wires that are bonded, twisted or braided together to form a single assembly. Typically, the ends of the electrical cable are connected to two devices thereby enabling the transfer of electrical signals from one device to another.

Further, an optic fiber cable is an electrical cable containing one or more optical fibers that are used to carry light. Fiber cable termination is the addition of connectors to each optical fiber in a cable. Typically, the fibers need to have connectors fitted before they are attached to other equipment. Two common solutions for fiber cable termination are pigtails and fan-out kits (breakout kits). Specifically, a fan-out kit is a set of empty jackets designed to protect fragile tight-buffered strands of fiber from a cable. This allows the individual fibers to be terminated without splicing and without needing a protective enclosure (such as a splicebox).

However, the existing optic fiber cables lack enhanced design and a more robust solution to easily fit in the customers' equipment.

In the light of the above discussion, there appears to be a need for providing a better fiber optic fan-out kit design with a more robust solution.

OBJECT OF INVENTION

The principal object of the embodiments herein is to provide a pre-configured fiber optic fan-out/break-out kit Closure/Housing for 8, 12, 24, or a custom number of fiber stranded fiber optic (round or oval) applications with custom or standard lengths. Specifically, the fiber optic fan-out/break-out kit Closure/Housing provides an enhanced design with a more robust solution to fit easily into a customer's equipment.

Another object of the embodiments herein is to allow the fiber optic cable manufacture to separate the 250-micron fibers and route them individually through 2 millimeter or 3 millimeter furcation tube.

Yet another object of the embodiments herein is to protect the delicate 250-micron fibers from being damaged during termination process of all industry standard connectors.

SUMMARY

The above-mentioned needs are met by a fiber optic fan-out/break-out kit Closure/Housing and a method for implementing the fiber optic fan-out/break-out kit Closure/Housing.

A fiber optic fan-out/break-out kit Closure/Housing for protecting fiber optic strands associated with the fiber optic cable. The fiber optic fan-out/break-out Closure/Housing comprises of a female shell, a male shell, an insert piece and an insert tool. The insert tool is temporarily attached to the insert piece thereby screwing the insert piece into the male shell.

An example of a method for implementing a fiber optic fan-out/break-out kit Closure/Housing includes fastening a male insert into a male cavity of a shell using a male insert tool to secure the fiber optic cable from protruding forward or backwards after assembling. Further, the method includes assembling a female and male shell/cover.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a fiber optic fan-out/break-out kit Closure/Housing that is assembled in a particular, pre-set manner. The following detailed description is intended to provide example implementations to one of ordinary skill in the art, and is not intended to limit the invention to the explicit disclosure, as one or ordinary skill in the art will understand that variations can be substituted that are within the scope of the invention as described.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides a fiber optic fan-out/break-out kit Closure/Housing that provides several enhanced elements for securing the fiber optic fan-out kit, ultimately preventing incorrect assembly. Specifically, the present invention consists of two housings, one female, one male, an insert piece and an insert tool. The fiber optic fan-out/break-out kit Closure/Housing is made of plastic. It will be appreciated to those skilled in the art that, any other suitable and/or similar material may be used. Further, the fiber optic fan-out kit is a complete housing/closure protecting the fiber optic strands associated with the fiber optic cable.

It should be appreciated to those skilled in the art that, "male housing" and "male shell/cover" may be interchangeable used throughout the description herein. Similarly, "female housing" and "female shell/cover" may be interchangeable used throughout the description herein.

Figure 1:
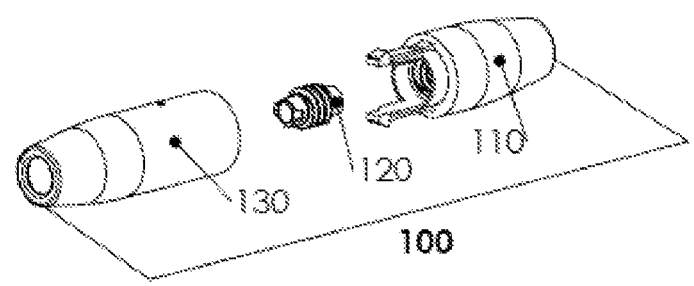
FIG. 1 illustrates an exploded perspective view of a fiber optic fan-out/break-out kit Closure/Housing, according to the embodiments as disclosed herein.

FIG. 1 illustrates an exploded perspective view of a fiber optic fan-out/break-out kit Closure/Housing 100, according to the embodiments as disclosed herein. The fiber optic fan-out/break-out kit Closure/Housing 100 includes a male shell/cover 110, a male insert 120 and a female shell/cover 130.

The male shell/cover 110 attaches to the female shell/cover 130 with attached fingers and end clips. The female shell/cover 130 attaches to the male housing with attached slots and pockets. Further, the male insert 120 screws into the male housing to hold the fiber optic cable in place securely.

Figure 2:
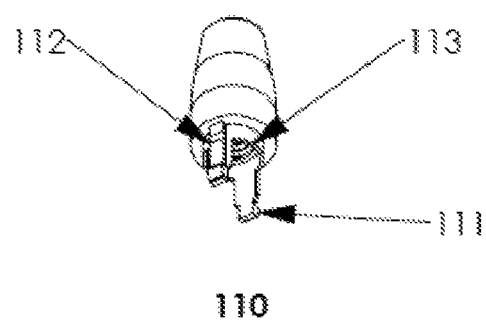
FIG. 2 illustrates an exploded view of the male shell/cover of the fiber optic fan-out/break-out kit Closure/Housing of FIG. 1, according to the embodiments as disclosed herein.

FIG. 2 illustrates an exploded view of the male shell/cover 110 of the fiber optic fan-out/break-out kit Closure/Housing 100 of FIG. 1, according to the embodiments as disclosed herein. The fiber optic fan-out/break-out kit Closure/Housing 100 includes two male clips 111, two male keys 112, and threaded cavity for the male insert 113.

Figure 3:
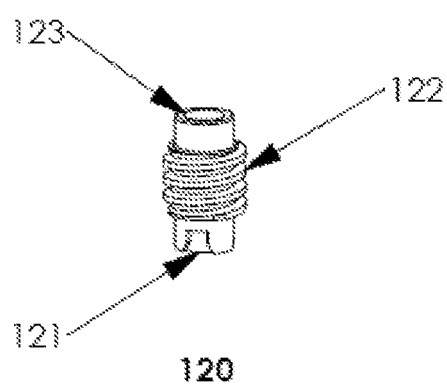
FIG. 3 illustrates an exploded view of the male insert of the fiber optic fan-out/break-out kit Closure/Housing of FIG. 1, according to the embodiments as disclosed herein.

FIG. 3 illustrates an exploded view of the male insert 120 of the fiber optic fan-out/break-out kit Closure/Housing 100 of FIG. 1, according to the embodiments as disclosed herein. The fiber optic fan-out/break-out kit Closure/Housing 100 includes threads 122 for connection of the male shell/cover 110 of FIG. 1 and added material for ease of handling 123. A notch 121 is also shown.

Figure 4:
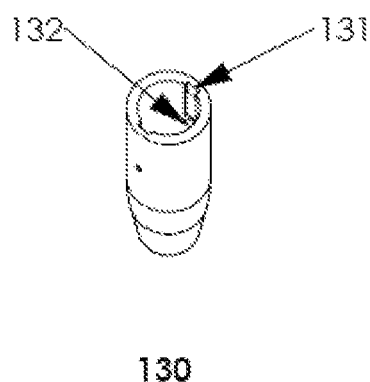
FIG. 4 illustrates an exploded view of the female shell/cover of the fiber optic fan-out/break-out kit Closure/Housing of FIG. 1, according to the embodiments as disclosed herein.

FIG. 4 illustrates an exploded view of the female shell/cover 130 of the fiber optic fan-out/break-out kit Closure/Housing 100 of FIG. 1, according to the embodiments as disclosed herein. The fiber optic fan-out/break-out kit Closure/Housing 100 includes two female slots 131 and two female slots 132 for male clips.

Figure 5:
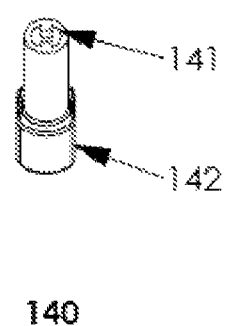
FIG. 5 illustrates an exploded perspective view of the fiber optic fan-out/break-out kit Closure/Housing of FIG. 1 in an assembled state, according to the embodiments as disclosed herein.

FIG. 5 illustrates an exploded perspective view of a male insert tool 140 for the fiber optic fan-out/break-out kit closure/housing 100 of FIG. 1, according to the embodiments as disclosed herein. The male insert tool 140 includes a female slot 141 to attach to the male insert 120 male notch 121. Further, the male insert tool 140 also includes a handle with indention 142 to assist the assembler/user with screwing in the male insert 120 into the male housing cavity 113.

Figure 6:
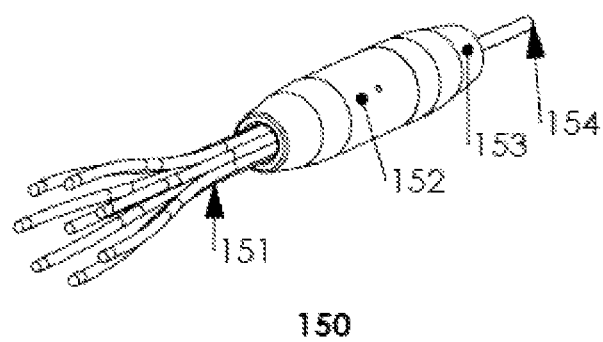
FIG. 6 illustrates an exploded view of an insert tool, according to the embodiments as disclosed herein.

FIG. 6 illustrates an exploded perspective view of the fiber optic fan-out/break-out kit Closure/Housing 100 of FIG. 1 in an assembled state 150, according to the embodiments as disclosed herein. The fiber optic fan-out/break-out kit Closure/Housing 100 includes a fiber optic furcation tube 151, a female shell/cover 152, a male shell/cover 153 and a fiber optic cable 154.

It will be appreciated to those skilled in the art that 150 is only for illustration purposes. The use of the fiber optic fan-out/break-out kit Closure/Housing 100 may be used for any configuration at any point in time.

Figure 7:
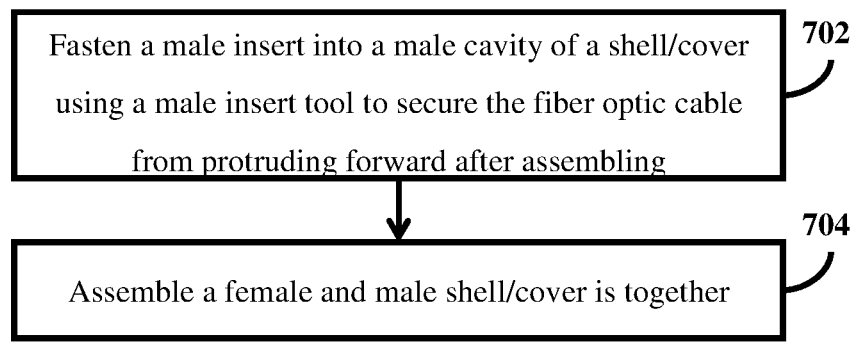
FIG. 7 is a flow chart describing a method for using the fiber optic fan-out/break-out Closure/Housing, according to the embodiments as disclosed herein.

FIG. 7 is a flow chart describing a method for using the fiber optic fan-out/break-out Closure/Housing, according to the embodiments as disclosed herein. The flow chart begins at step 702.

Specifically, the present invention is used as a closure/housing to protect fiber strands from exposure and damage.

At step 702, a male insert is fastened into a male cavity of a shell/cover using a male insert tool to secure the fiber optic cable from protruding forward after assembling.

At step 704, a female and male shell/cover is assembled together.

The method ends at step 704.

The fiber optic fan-out/break-out kit Closure/Housing is beneficial for several reasons as listed below:
1. Provides an enhanced design thereby making it end-user friendly.
2. Provides a snap-fit design.
3. Provides a smaller outer diameter.
4. Allows effective and efficient manufacturing process.
5. Provides a robust solution.
6. Minimizes unnecessary assembly steps thereby making the manufacturing process simple.

Accordingly, the disclosure of the present invention is intended to be illustrative, but not limiting, of the scope of the invention, which is set forth in the following claims.

The invention claimed is:

1. A fiber optic fan-out/break-out kit Closure/ Housing for protecting fiber optic strands associated with the fiber optic cable, the fiber optic fan-out/break-out kit Closure/ Housing comprising:
   a female shell and male shell; and
   a male insert piece having screw threads for connecting to the male shell, and having added material for ease of handling, and further having a male notch for accommodating an insert tool;
   wherein the insert tool is temporarily attached to the male notch of the male insert piece for screwing the male insert piece into the male shell.

2. The fiber optic fan-out/break-out kit Closure/ Housing of claim 1 wherein the female shell further comprises:
   two female key slots; and
   two female clip slots at the opening of the mouth of the female shell.

3. The fiber optic fan-out/break-out kit Closure/ Housing of claim 1 wherein the male shell attaches to the female shell with attached fingers and end clips.

4. The fiber optic fan-out/break-out kit Closure/ Housing of claim 1 wherein the female shell attaches to the male shell with attached slots and pockets.

5. The fiber optic fan-out/break-out kit Closure/ Housing of claim 1 wherein the male insert screws into the male shell to secure the fiber optic cable from protruding forward after assembly.

6. The fiber optic fan-out/break-out kit Closure/ Housing of claim 1 wherein the male shell further comprises:
   two male keys and two male clips at the top of the mouth to secure the female shell to the male shell when assembled together.

7. A method for implementing a fiber optic fan-out/break-out kit Closure/Housing, the method comprising:
   fastening a male insert into a male cavity of a shell using a male insert tool to secure the fiber optic cable from protruding forward after assembling; and
   assembling a female and male shell/cover.

* * * * *